United States Patent

Callaghan et al.

[11] Patent Number: 5,651,474
[45] Date of Patent: Jul. 29, 1997

[54] CRYOGENIC STRUCTURES

[75] Inventors: Michael T. Callaghan; William K. Schrader, both of Florissant; Robert E. Duckert, St. Ann, all of Mo.

[73] Assignee: The United States of America as represented by the Secretary of the Air Force, Washington, D.C.

[21] Appl. No.: 590,965

[22] Filed: Jan. 24, 1996

Related U.S. Application Data

[63] Continuation of Ser. No. 363,770, Dec. 22, 1994, abandoned.

[51] Int. Cl.$^6$ ................................................ B65D 8/00
[52] U.S. Cl. ........................... 220/565; 220/581; 220/590
[58] Field of Search ........................... 220/586, 565, 220/4.13, 581, 584, 590

[56] References Cited

U.S. PATENT DOCUMENTS

| | | | |
|---|---|---|---|
| H943 | 8/1991 | Garvey | 220/456 |
| 3,314,567 | 4/1967 | Becker et al. | 220/565 X |
| 3,528,582 | 9/1970 | Rigollot | 220/581 |
| 4,343,409 | 8/1982 | Silver | 220/565 X |
| 4,356,925 | 11/1982 | Gerhard | 220/581 X |
| 4,592,950 | 6/1986 | Le Touche | 428/284 |
| 4,821,907 | 4/1989 | Castles et al. | 220/5 A |
| 4,946,056 | 8/1990 | Stannard | 220/584 |
| 4,988,014 | 1/1991 | Varghese et al. | 220/469 |
| 5,012,948 | 5/1991 | Van Den Bergh | 220/437 |
| 5,025,943 | 6/1991 | Forsman | 220/590 X |
| 5,284,996 | 2/1994 | Vickers | 220/590 X |

OTHER PUBLICATIONS

Owens–Corning Fiberglas, Textile Fiber Materials for Industry, Feb. 1964.

*Primary Examiner*—Steven M. Pollard
*Attorney, Agent, or Firm*—Thomas C. Stover

[57] ABSTRACT

The invention provides cryogenic structures, e.g. vessels or tanks joined by longerons, which are made of durable plastic composite materials rather than of metal, which vessels can contain cryogenic materials including fuel, without need of a liner or other weighty layers of the prior art. The structures are made of, e.g. a fiber network impregnated with a matrix of thermoset plastics, thermoplastics or a combination thereof. Thus the invention includes a cryogenic vessel of, e.g. 3 tank lobes, made of a composite of plastic reinforced with fibers, which lobes are joined together and supported by woven, cruciform shaped longerons which are also impregnated with plastic, to define a composite support member.

11 Claims, 3 Drawing Sheets

CRYOGENIC STRUCTURES

This application is continuation of application Ser. No. 08/363,770, filed 22 Dec. 1994, now abandoned.

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to cryogenic structures particularly those of durable plastics.

2. The Prior Art

Traditional cryogenic structural materials are usually metallic, which impose severe weight penalties on the design employed.

Graphite/epoxy composite structures have been tried but have been found not suitable for cryogenic applications due to microcracking and the need to incorporate a metallic liner. The liner and its composite structure however, usually have different coefficients of thermal expansion resulting in disbonding of the liner and its composite structure.

For a disclosure of a lined cryogenic tank, see for example USSIR H943 to Garvey and the references cited therein.

There is a need however, to provide a cryogenic structure, including a vessel or tank, that overcomes the above prior art shortcomings.

There has now been discovered the use of suitable materials for cryogenic structures that do not require a metallic liner and provide a more durable cryogenic structure at often reduced costs.

SUMMARY OF THE INVENTION

Broadly the present invention provides one or more cryogenic structures having a fiber network impregnated with a matrix of thermoset or thermoplastic resins, or a combination thereof.

Such cryogenic structures can include vessels, e.g. tanks and support members, e.g. a longeron.

BRIEF DESCRIPTION OF THE DRAWINGS

The invention will become more apparent from the following detailed specification and drawings in which.

DESCRIPTION OF PREFERRED EMBODIMENTS

Figure 1:
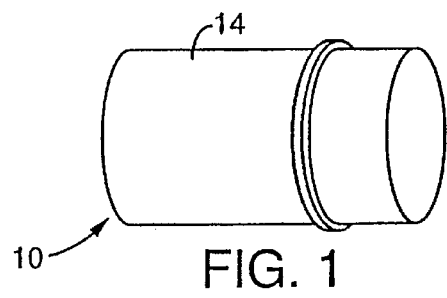
FIG. 1 is a perspective schematic view of a cryogenic tank of the prior art.

Referring in more detail to the drawings, prior art cryogenic tank 10 is shown in FIG. 1, having a metallic liner 12 and an outer shell 14 of, e.g. graphite fiber-reinforced fiberglass or a glass-reinforced polymer matrix. At reduced temperatures, the liner and shell are subject to disbonding therebetween as discussed above.

Figure 4:
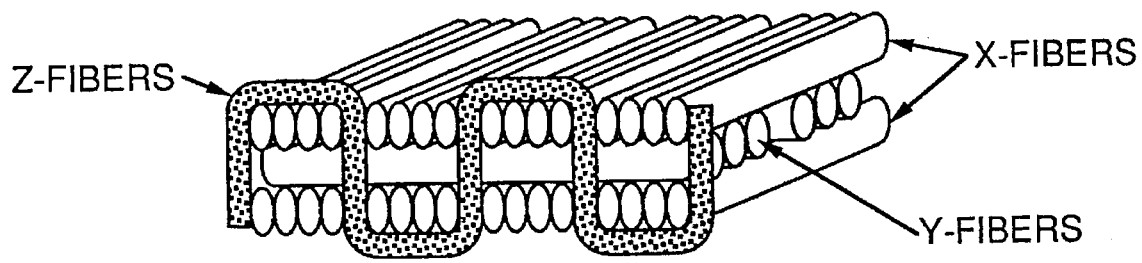
FIG. 4 is a perspective schematic view of a portion of a cryogenic structural member embodying the present invention.

The present invention provides, eg. 3 tank-like lobes 42, 44 and 46, joined by longerons 52 and 53, as shown in FIG. 4 and further described below.

Figure 3:
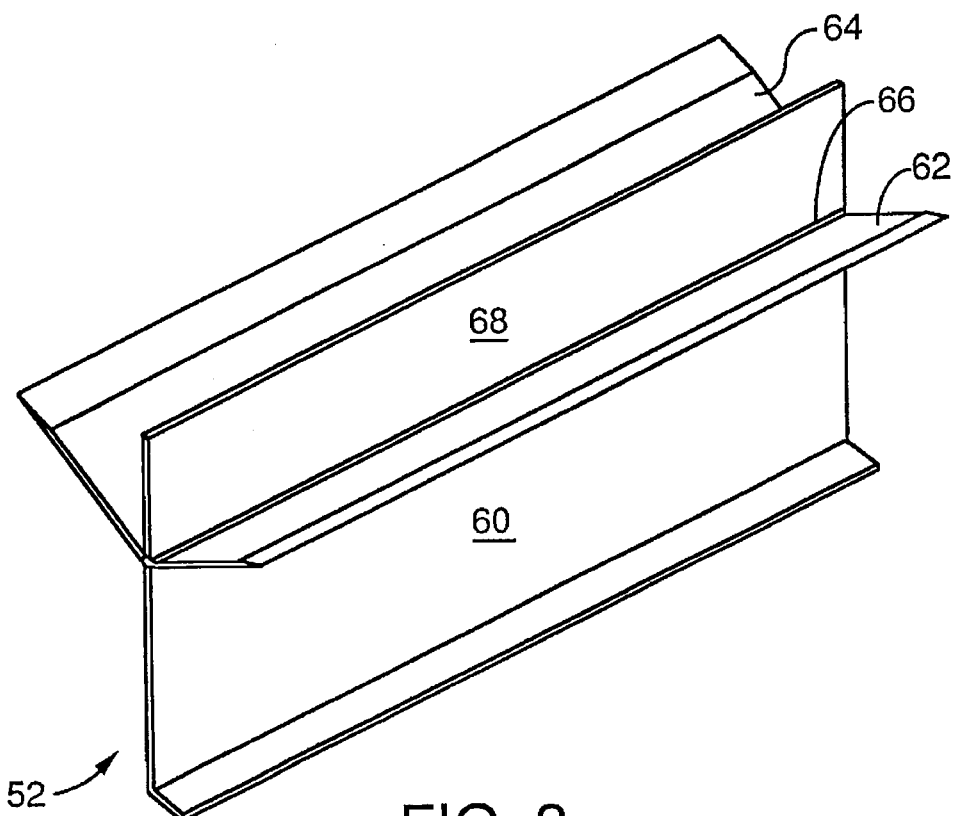
FIG. 3 is another cryogenic structural member made according to the method of the present invention.

The longerons are, eg. cruciform in cross-section, as best seen in FIG. 3, where a crows foot cross-sectional shape is indicated. Thus per FIG. 3, longeron 52 has several components including, a lower body 60 and an upper body 68, with two branching flanges 62 and 64 (at, eg. joint 66) mounted thereto.

Such longeron 52, including its above components, is suitably made of woven fibers, i.e. X, Y, & Z fibers, as shown in FIG. 4 and further described below.

Figure 2:
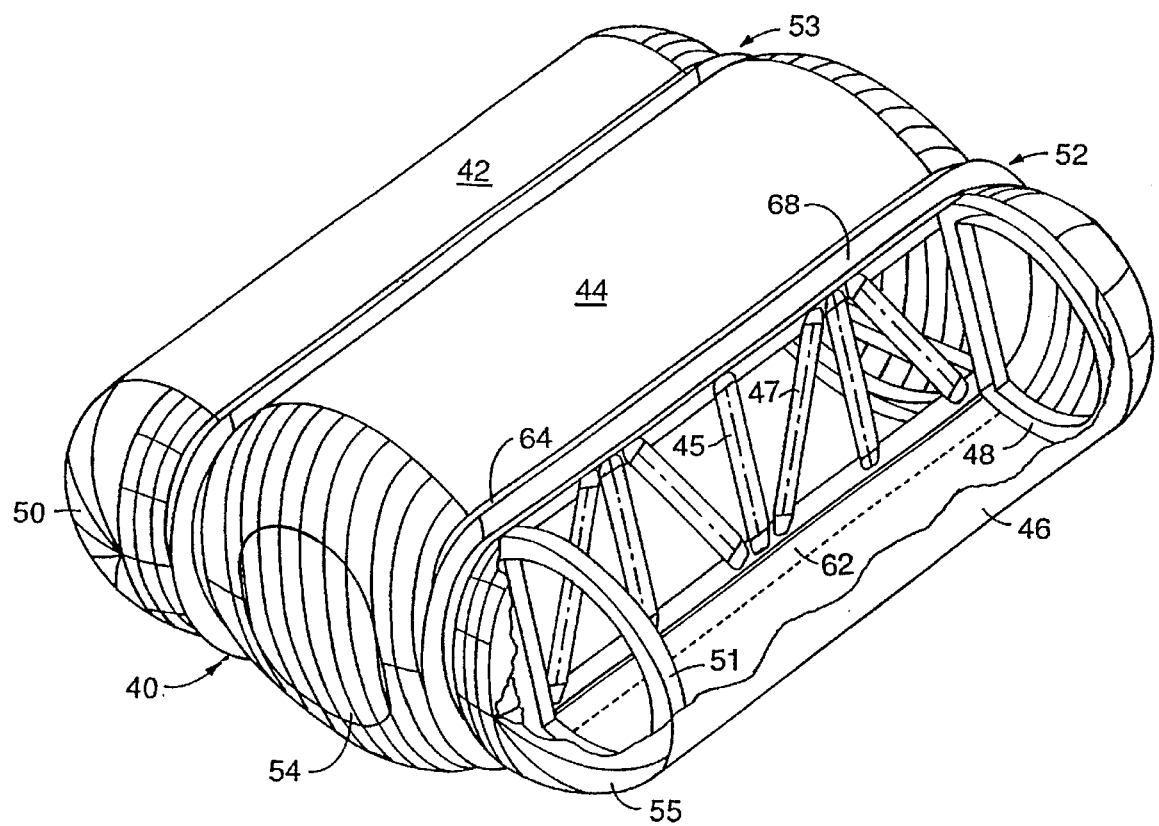
FIG. 2 is a schematic perspective sectional view of a cryogenic vessel made by the method of the present invention.

In an example of a cryogenic structure made per the method of the present invention, a multi-lobe tank 40, e.g., as shown in FIG. 2, is constructed to maximize fuel volume while minimizing weight. The tank 40 includes a series of tubular lobes 42, 44 and 46 connected to each other by way of a cruciform-shaped longeron 52 mounted between tubes 42, 44, and 46 and a similar longeron 53 mounted between tubes 42, 44, as shown in FIG. 2.

Referring now to FIGS. 2 and 3, one sees that longeron assembly 52 (and 53) is oval shaped (being formed of straight and curved longeron sections) and bridged and braced by cross members, eg. structural stiffeners 45 and 47 as well as the other stiffeners shown in FIG. 2.

As noted above, the longeron 52 has branching flanges 62 and 64 which extend over the adjacent surfaces of their respective tubes or lobes 42, 44 and 46, which flanges are attached thereto to support and seal such lobes as shown or indicated in FIGS. 2 and 3. Thus in FIG. 2, one can see flange 64 mounted over an adjacent surface of lobe 44 and flange 62 mounted under a surface of lobe 46. Also rounded longeron ribs 48 and 51 support the end domes of their respective lobes, e.g. lobe 46, as shown in FIG. 2.

The cruciform-shaped longeron 52 (and 53) serves not only to act as a load carrying structure but can also be used, at upper body 68, as an attach point to the fuselage (or body) of an aircraft or other vehicle (not shown). The respective tubes or lobes are capped with composite end domes, e.g. domes 50, 54 and 55, as shown in FIG. 2.

The tank tubes, e.g. lobes 42, 44 and 46, are fabricated in one of several ways. Skins can be filament-wound on a rotating mandrel, the winding of a group of fibers being pre-impregnated (between the fibers) with resin and subsequently cured in an autoclave.

For a PEEK winding, the tank skins are heated to about 720°±10° F. for about 30 minutes, allowing the pre-impregnated fiber layers to fuse together. The PEEK is then cooled and sets up as a solid matrix which grips the fibers.

The so cured tank tubes can then be cut for subsequent splicing to the longerons. For relatively flat skins, ply locating by hand lay-up on a tool or by mechanized fiber placement are techniques that can be utilized.

As indicated above, the tank tubes are made up of prepreg fiber bundles which are wound or layed-up as noted above. The bundles of are of, e.g. 6,000 fibers (e.g. 5 microns in diameter) which are held together by resin or woven into a mat having, e.g. X & Y fibers or positioned in various other directions or all aligned in one direction, known as a "tape".

Thus in making longerons, one weaves the dry fibers into the preform shape desired and infiltrates same with flowable resin which is then cured, if a thermoset resin or cooled, if a thermoplastic resin. That is, the resin flows between and around the fibers and solidifies and grips same, while the fibers reinforce the resin matrix.

However in skin formation of a tank tube herein, one lays-up or winds prepreg fiber bundles and again cures or cools same. Again the resin solidifies to a matrix which grips the fibers and again the fibers reinforce the resin matrix.

The cruciform shaped longerons, 52 and 53 and structural stiffeners 45 and 47, shown in FIG. 2, can be molded using a woven preform made from carbon fibers. The fiber architecture utilized for the preform is known as angle interlock. Such preform is characterized by X & Y in-plane fibers, weaving multiple layers of fabric, with the Z out-of-plane fibers interlocking the layers of fabric, e.g. as shown in FIG. 4 hereof. The through-the thickness Z fibers provide improved damage tolerance and interlaminar shear resistance. The percentage of X, Y and Z fibers can be tailored to meet the specific needs of the tank design.

Resin infiltration into the woven preform is achieved by co-mingling carbon and resin fibers, resin transfer molding, compression molding or pultrusion. For comingling of fibers, thermoplastic (e.g. PEEK) fibers can be woven into the carbon fibers and melted to achieve resin infiltration around and between the carbon fibers. Resin infiltration is also achieved by pumping heated resin into a tool cavity holding (or forming) the dry fiber preform.

The end domes, e.g. domes 50, 54 and 55 are fabricated by diaphragm forming (for thermoplastics), hand lay-up or fiber placement. End domes fabricated from PEEK are made by sandwiching sheets of composite prepreg between two sheets of (eg. "Supral™") superplastic aluminum alloy. The "prepreg" sheets are layers of fibers impregnated with a plastic matrix, eg. in the manner described above.

Figure 5:
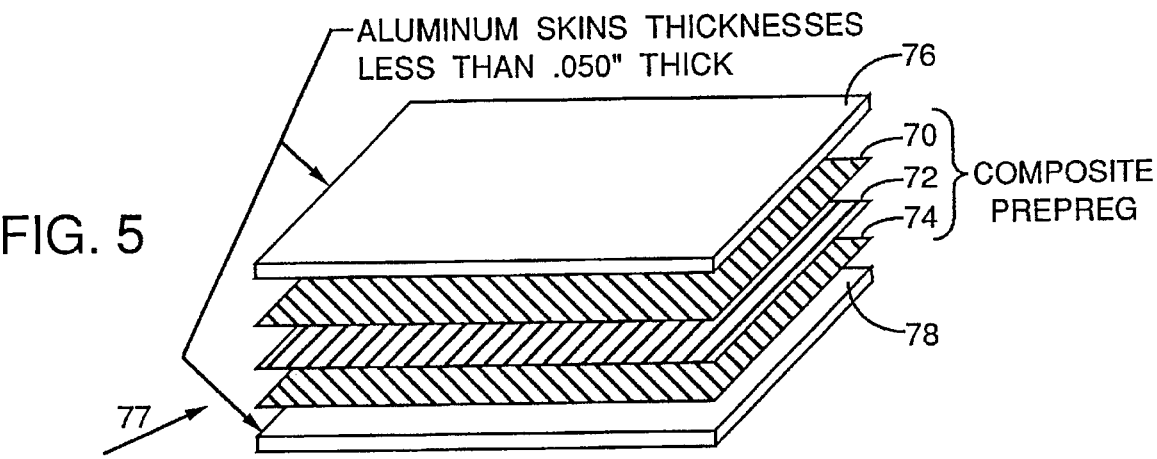
FIG. 5 is a perspective view of layers of material ready for processing into another component of a cryogenic vessel embodying the present invention and FIGS. 6, 7 and 8 demonstrate method steps for processing the component layers shown in FIG. 5.
Figure 6:
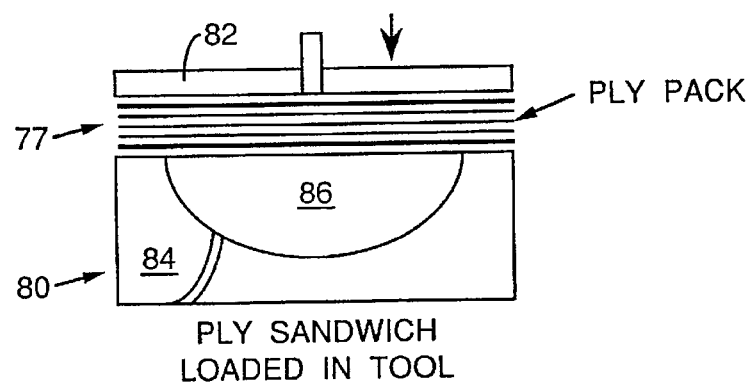
Figure 7:
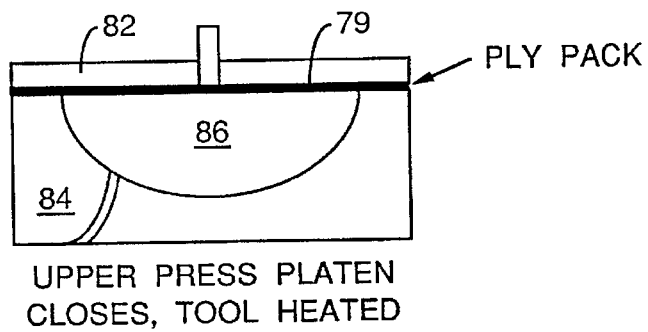

Thus, as shown in FIG. 5, a plurality of, e.g. three composite prepreg layers 70, 72, and 74, are placed between aluminum skins 76 and 78 and placed in a press 80 having an upper platten 82 and a lower platten, 84, with a mold cavity 86 therein, as shown or indicated in FIGS. 5 and 6. The press platten 82 lowers against the lower mold platten 84, compressing the above prepreg and aluminum layers together, with heat applied (e.g. to 720° F.) to the press platens, causing the resin in the prepreg plies to soften.

Figure 8:
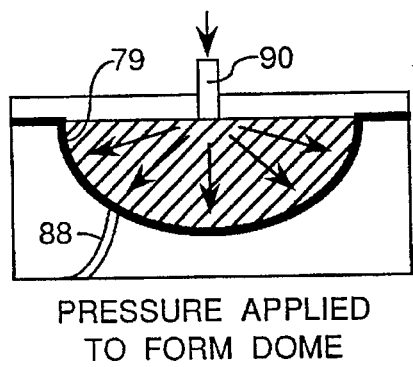

The mold cavity 86 is then evacuated through a duct 88 in mold platen 84 and heated high-pressure gas is applied against the softened laminate 79 through duct 90, to superplastically form such laminate into a dome shape in cavity 86, as shown in FIG. 8. Temperature and pressure is maintained until a compressed laminate has formed, e.g. (for 30 minutes).

The so-formed dome is allowed to cool, the mold 80 is opened and the so-formed dome is removed and trimmed to provide, e.g. dome 54, shown in FIG. 2. The lobes or tubes 42, 44 and 46 are then capped with the above resulting domes 50, 54 and 55 and the structure is joined together with the use of epoxy-based adhesives or melt fusion (for thermoplastic resins only). That is, the above components can be joined together through the use of epoxy adhesives cured in conventional ovens. For thermoplastic composites, melt fusion can be used to join components together outside of an autoclave.

As noted above the cryogenic structures of the invention are made of thermoset composites, thermoplastic composites or a combination thereof.

For example, the composite material comprises continuous carbon fiber reinforcement impregnated with a polyaromatic thermoplastic matrix such as polyaryletherketone (PAEK), polyetheretherketone (PEEK), polyetherimide (PEI), polyethersulfone (PES) or polyarylsulfone; or in the alternative, a thermosetting or thermoplastic polyimide matrix, a thermosetting bismaleimide matrix or a thermosetting epoxy matrix.

In addition, the above matrices may contain various additives, such as amide or carboxyl terminated butadiene acrylonitrile rubbers (ATBN's and CTBN's) antioxidants and thixotropic modifiers.

Furthermore, thermoplastic and thermosetting polymer matrices may be combined in order to obtain the synergistic improvements each imparts to the resultant polymer blend. For example, rubber and thermoplastic polymer additives to an epoxy resin formulation improve the fracture toughness and damage tolerance of manufactured composite structures. Bismaleimide resins may also be added to the epoxy formulation to increase the structural use temperature and heat distortion temperature of the polymer blend.

For a further discussion of improving the fracture toughness and damage tolerance of resin matrices such as described herein, see an Article entitled "Development and Characterization of Thermosetting-Thermoplastic Polymer Blends for Applications in Damage-tolerant Composites" by R. S. Raghava in the Journal of Polymer Science: Part B: Polymer Physics, Vol. 26, pp.65–81 (1988), which Article is incorporated herein by reference.

As to the above toughened epoxy resin matrix systems employed in the laminated and cured composite structure, the resultant microstructure and resin morphology is determined by the selection of resin ingredients and the mixing process. Phase separations which occur during mixing or during the early stages of the composite cure process, are important to the development of adequate fracture toughness in a toughened epoxy resin. In the preferred formulations, the phase separation results in a continuous epoxy phase which encapsulates and surrounds discontinuous rubber and/or thermoplastic phases. The continuous epoxy phase ensures adequate resistance to solvents and hydrocarbon base fluids (lubricants, oils, hydraulic fluids, fuels, coolants and the like).

Thus the present invention provides more durable cryogenic structures, e.g. vessels, made of certain resins that are tougher, have improved durability and damage tolerance. As noted above, these materials include toughened epoxy thermoset composites and thermoplastic composites. Advantages of the above materials over the metallic materials of the prior art include structural efficiency, tailorability of properties and performance and lower cost of fabrication.

Cryogenic structures of the present invention, are highly suitable for use in various cryogenic applications, including rockets and spacecraft, cryogenic components (e.g. tanks, fuel lines and valves) commercial cryogenic vessels, including tanks and lines as well as for superconductivity applications, where cryogen containment is desired or required, or other structures which are exposed to cold temperatures.

What is claimed is:

1. A cryogenic structure comprising, a plurality of lobes and at least one flanged longeron connecting said lobes together, said longeron being woven with fibers in the X and Y directions in at least two substantially continuous overlying layers and having fibers woven in the Z direction relative to the X and Y fibers adjacent thereto, said fibers woven in the Z direction encompassing said at least two substantially continuous overlying layers of fibers in the X and Y directions.

2. The structure of claim 1 wherein said lobes have a fiber network skin and said skin and longeron are impregnated with matrices selected from the group consisting of a thermoset resin, a thermoplastic resin and a combination thereof.

3. The structure of claim 2, wherein said thermoset resins are selected from the group consisting of polycarbonates, PVC and ABS.

4. The structure of claim 3, wherein said thermoset resins are selected from the group consisting of thermosetting matrices of polyimide, bismaleimide and epoxy.

5. The structure of claim 2, wherein said thermoplastic resins are selected from the group consisting of polyethylene, polypropylene and polystyrene.

6. The structure of claim 5, wherein said resins are thermoplastic matrices selected from the group consisting of polaryletherketone, polyetheretherketone, polyetherimide, polyethersulfone, and polyarylsulfone.

7. The structure of claim 1 wherein said longeron has a cruciform shape in cross-section.

8. The structure of claim 1 formed into a vessel or tank.

9. The structure of claim 1, wherein said fibers are continuous carbon fibers.

10. The structure of claim 1, being a vessel having a 3 lobes joined by 2 cruciform shaped longerons.

11. The vessel of claim 1, wherein each lobe has at least one end cap of a plurality of prepreg resin-fiber layers pressed together in a dome shape.

* * * * *